(12) United States Patent
Bastien

(10) Patent No.: US 10,312,756 B2
(45) Date of Patent: Jun. 4, 2019

(54) SPOKED ROTOR WITH INNER STRUCTURAL BRIDGES PROVIDING LOW FLUX LEAKAGE

(71) Applicant: Nidec Motor Corporation, Kansas City, MO (US)

(72) Inventor: Ryan M. Bastien, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 82 days.

(21) Appl. No.: 15/474,913

(22) Filed: Mar. 30, 2017

(65) Prior Publication Data

US 2017/0288484 A1    Oct. 5, 2017

Related U.S. Application Data

(60) Provisional application No. 62/315,971, filed on Mar. 31, 2016.

(51) Int. Cl.
*H02K 1/27*    (2006.01)

(52) U.S. Cl.
CPC ......... *H02K 1/2773* (2013.01); *H02K 1/2706* (2013.01); *H02K 2213/03* (2013.01)

(58) Field of Classification Search
CPC ...... H02K 1/27; H02K 1/2706; H02K 1/2773; H02K 2213/03
USPC .................................................. 310/216.008
See application file for complete search history.

(56) References Cited

U.S. PATENT DOCUMENTS

| 5,786,650 A * | 7/1998 | Uchida | H02K 1/2773 310/156.55 |
| 8,456,055 B2 * | 6/2013 | Kinoshita | H02K 1/24 310/216.008 |
| 9,362,792 B2 | 6/2016 | Figgins et al. | |
| 2009/0230803 A1 * | 9/2009 | Nakayama | H02K 1/2766 310/156.56 |
| 2013/0134823 A1 * | 5/2013 | Yamada | H02K 1/24 310/216.004 |
| 2013/0221789 A1 * | 8/2013 | Atkinson | H02K 1/276 310/156.67 |
| 2015/0026966 A1 * | 1/2015 | Fang | H02K 1/276 29/598 |

* cited by examiner

*Primary Examiner* — Naishadh N Desai
(74) *Attorney, Agent, or Firm* — Hovey Williams LLP

(57) ABSTRACT

A rotor is provided for use in an electric motor. The rotor is rotatable about an axis. The rotor includes a core including a plurality of arcuately arranged pole segments arranged arcuately the axis. The rotor further includes a plurality of arcuately arranged magnets alternating with the pole segments, such that each of the magnets is at least in part interposed between a pair of adjacent pole segments. Still further, the rotor includes a support structure at least in part supporting the pole segments. The core further includes a plurality of bridges. Each of the bridges extends between and interconnects a corresponding one of the pole segments to the support structure. Each of the bridges includes a plurality of axially spaced apart bridge segments.

20 Claims, 11 Drawing Sheets

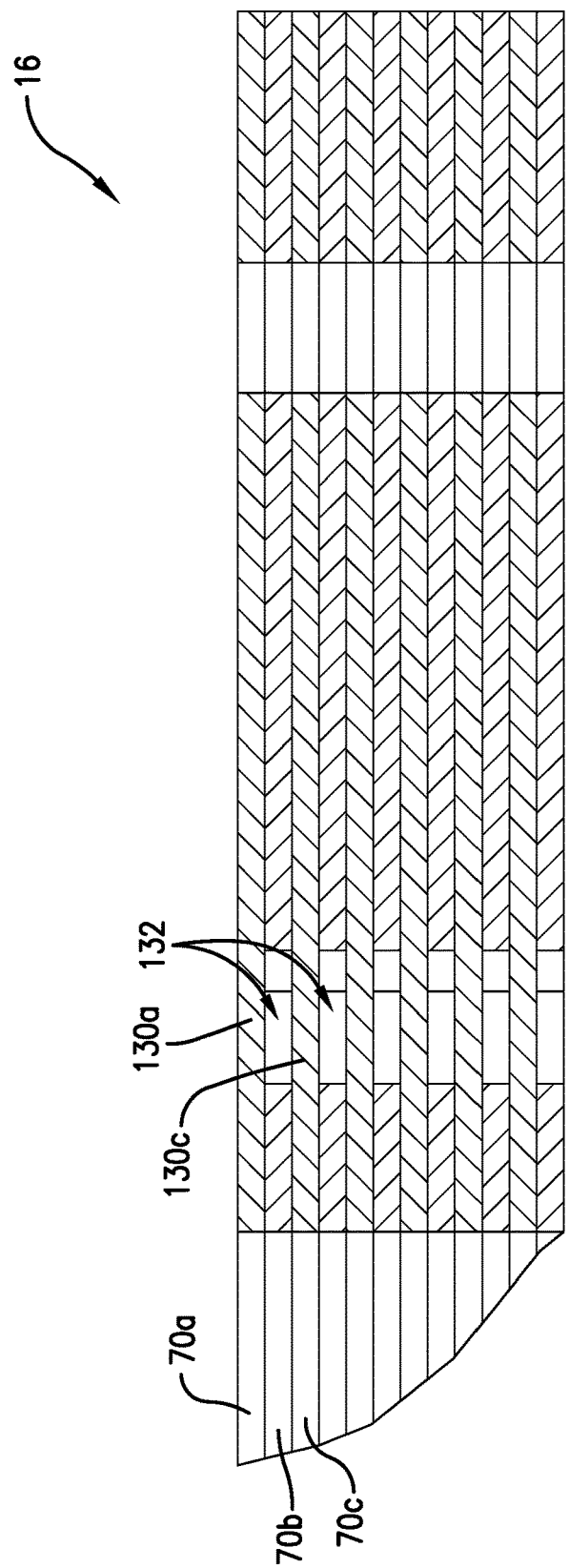

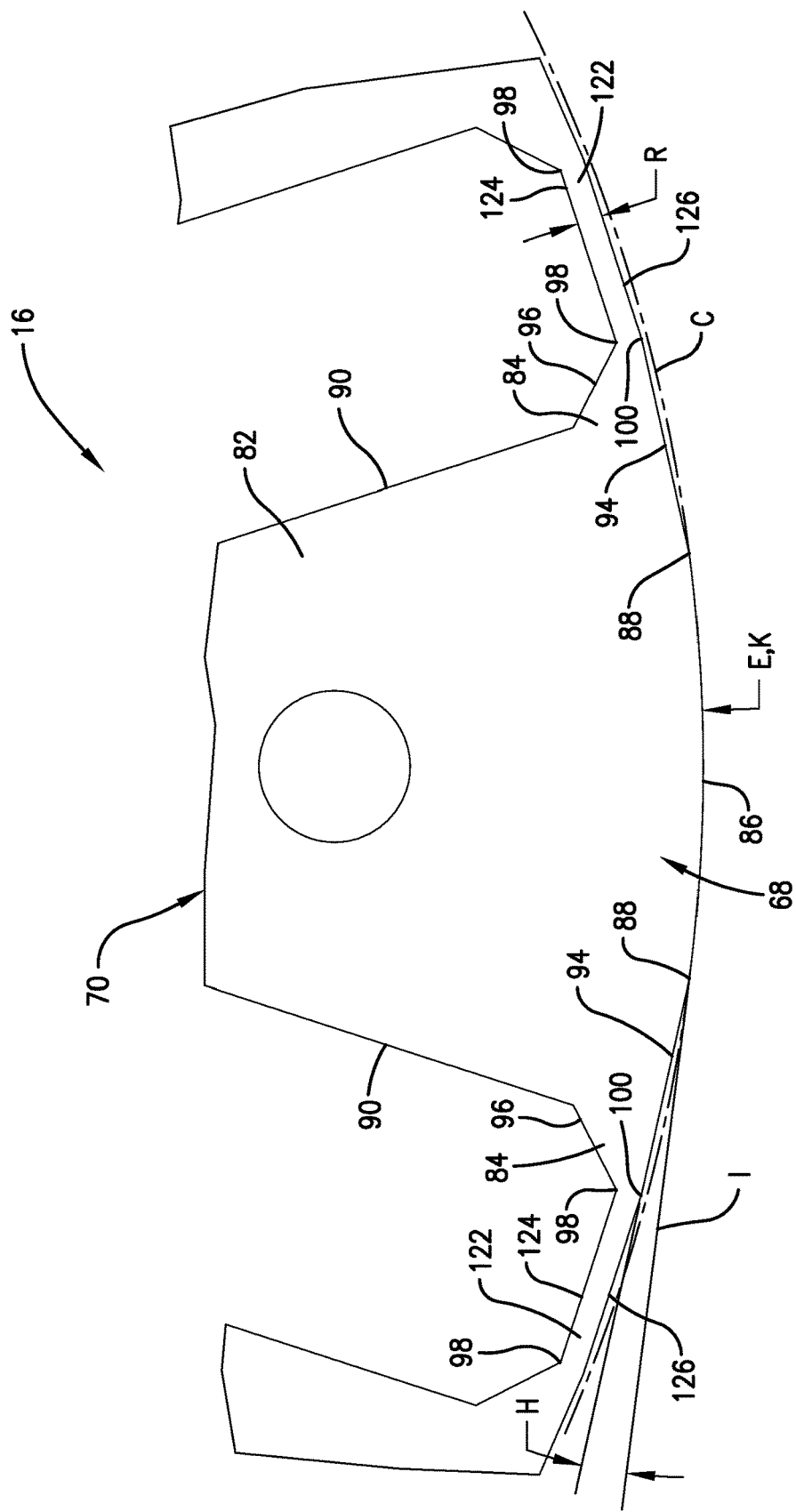

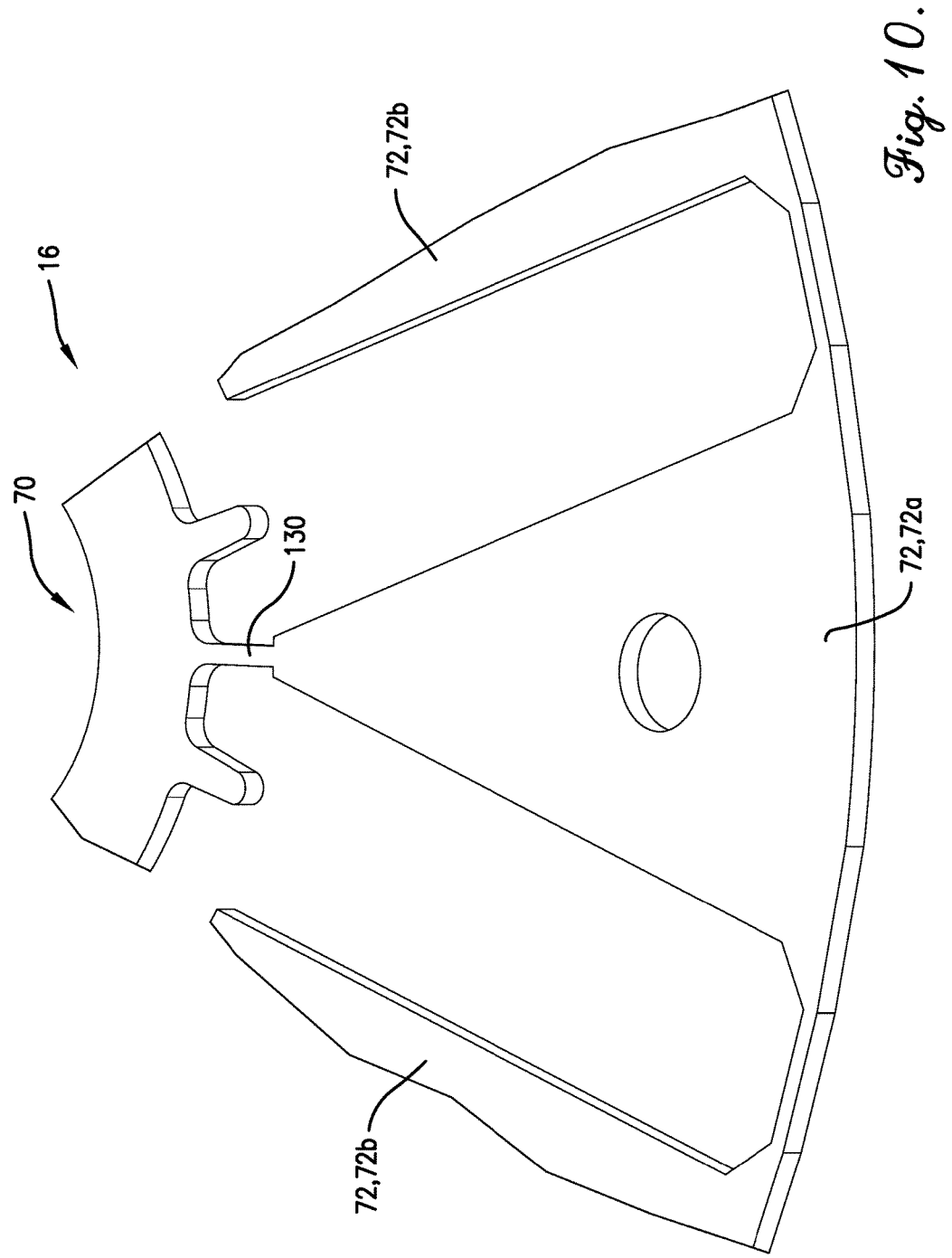

SPOKED ROTOR WITH INNER STRUCTURAL BRIDGES PROVIDING LOW FLUX LEAKAGE

CROSS-REFERENCE TO RELATED APPLICATIONS

Priority Application

The present application claims priority from U.S. Provisional Application No. 62/315,971, filed Mar. 31, 2016, the entire disclosure of which is hereby incorporated by reference herein.

Contemporaneously Filed Application

The present application is filed contemporaneously with U.S. patent application Ser. No. 15/474,921, entitled SPOKED ROTOR WITH TAPERED POLE SEGMENTS, filed Mar. 30, 2017, the entire disclosure of which is hereby incorporated by reference herein.

BACKGROUND OF THE INVENTION

1. Field of the Invention

The present invention relates generally to an electric motor. The motor preferably improves system efficiency in applications including but not limited to heating, ventilation, and air conditioning (HVAC) systems; pumps; and home appliances. Yet further, the motor preferably reduces operational vibration and/or noise. More particularly, the motor preferably concentrates magnetic flux and reduces flux leakage, resulting in higher power density, in addition to reducing cogging torque, torque ripple, and noise. Yet further, the motor ideally has low manufacturing complexity, high structural rigidity, and reduced active material and cost.

2. Discussion of the Prior Art

Electric motors are conventionally used in applications including but not limited to heating, ventilation, and air conditioning (HVAC) systems; pumps; and home appliances. Such motors conventionally include a stator and a rotor. The rotor conventionally includes a generally toroidal rotor core and a plurality of surface magnets mounted about a perimeter of the core.

SUMMARY

According to one aspect of the present invention, a rotor for use in an electric motor is provided. The rotor is rotatable about an axis. The rotor comprises a core including a plurality of arcuately arranged pole segments arranged arcuately the axis; a plurality of arcuately arranged magnets alternating with the pole segments, such that each of the magnets is at least in part interposed between a pair of adjacent pole segments; and a support structure at least in part supporting the pole segments. The core further includes a plurality of bridges. Each of the bridges extends between and interconnects a corresponding one of the pole segments to the support structure. Each of the bridges comprises a plurality of axially spaced apart bridge segments.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 7 is a partially fragmentary cross-sectional view of the rotor core of FIG. 6 and others, taken along line 7-7 of FIG. 6, and particularly illustrating the offset nature of the rotor laminations and consequent formation of axially discontinuous interior structural bridges;

FIG. 9a is a further enlarged, fragmentary top view of the portion of the rotor core of FIG. 8, further illustrating geometric features thereof;

FIG. 10 is a top perspective view of a single laminations of the portion of the rotor core shown in FIG. 9a.

Figure 1:
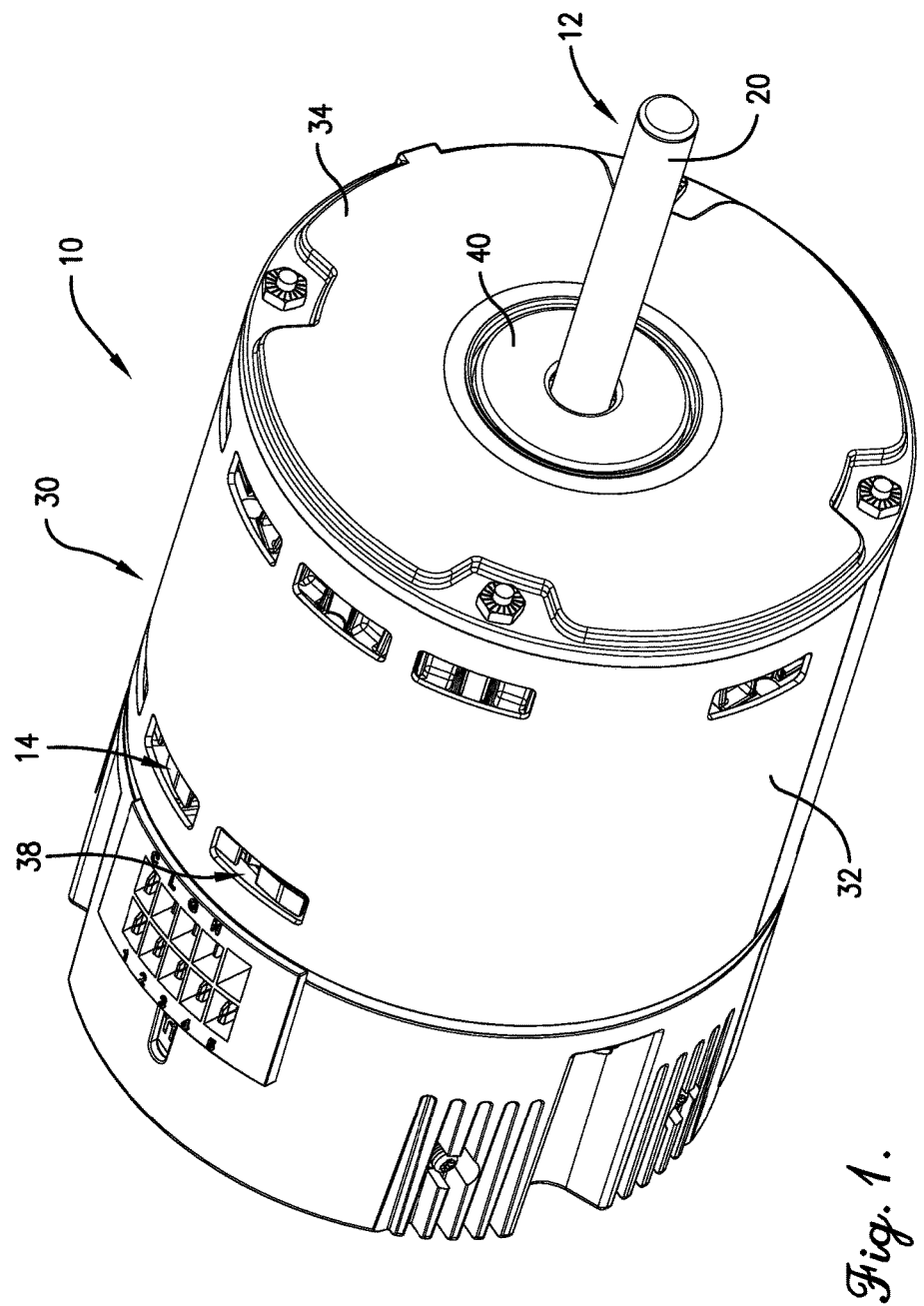
FIG. 1 is a perspective view of a motor in accordance with a first preferred embodiment of the present.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Motor Overview

Figure 2:
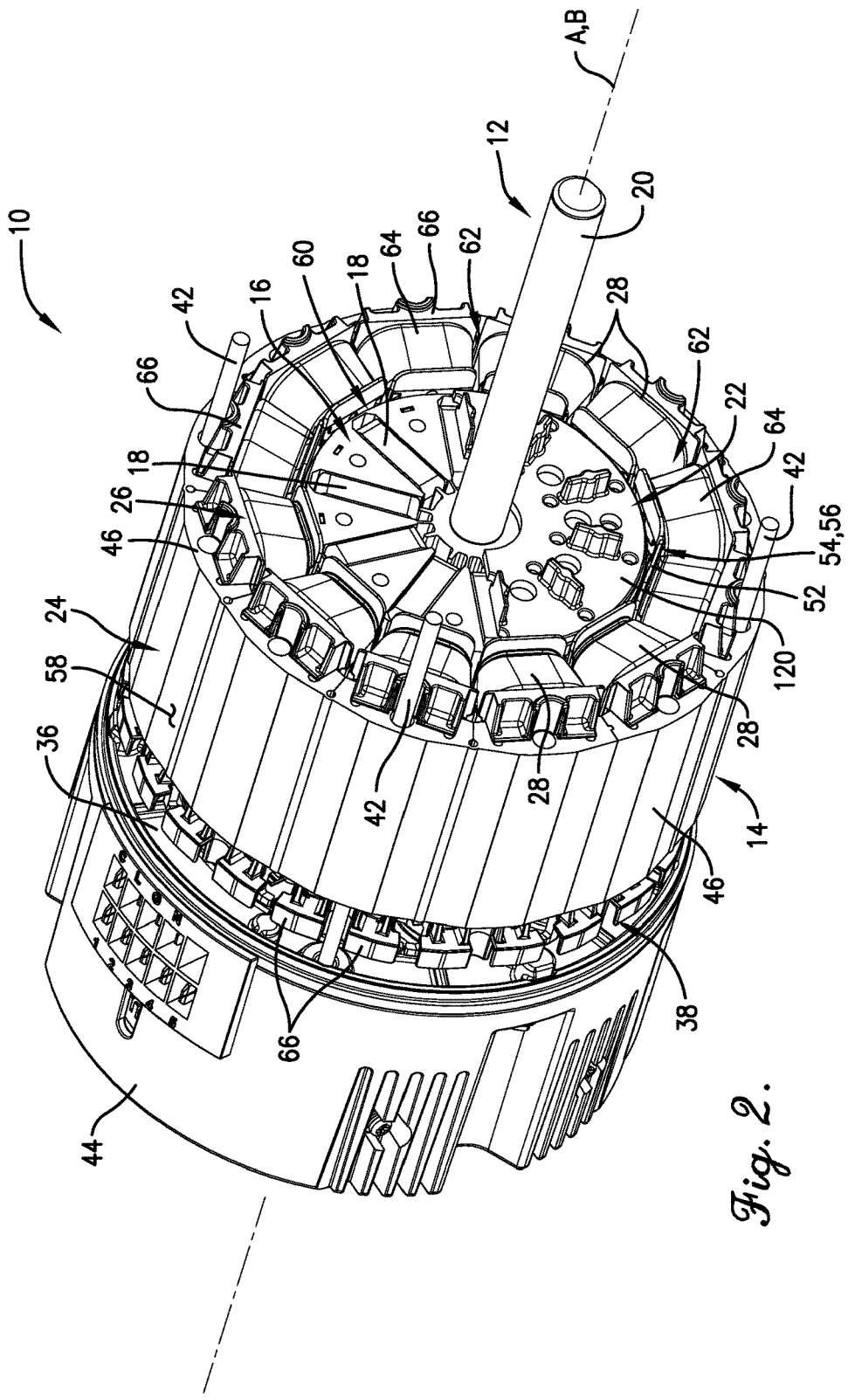
FIG. 2 is a perspective view of the motor of FIG. 1, with the shell removed to expose the rotor and the stator and with a portion of the rotor overmolding removed to reveal the rotor core and magnets.
Figure 3:
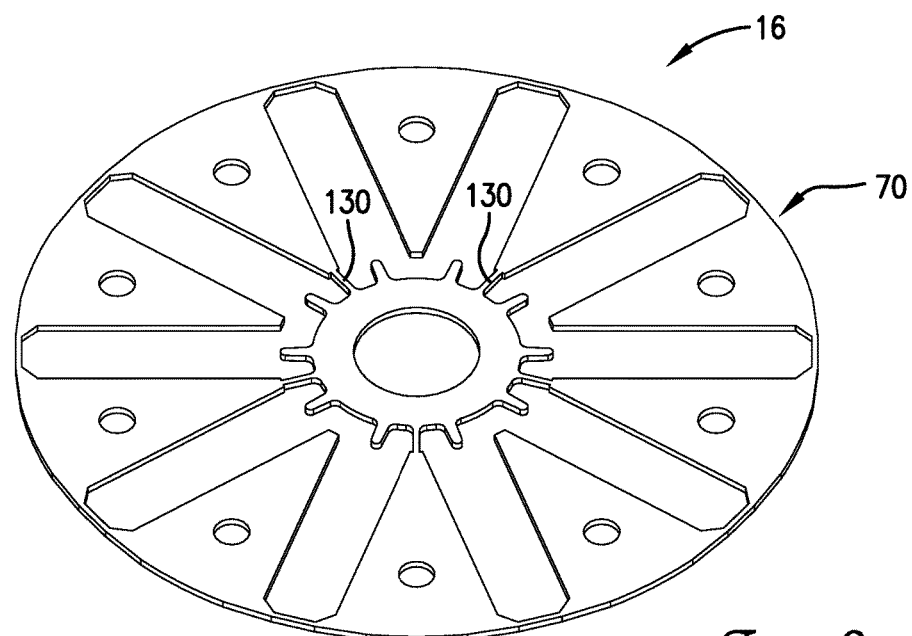
FIG. 3 is a top perspective view of a single lamination of the rotor core of FIG. 2.
Figure 4:
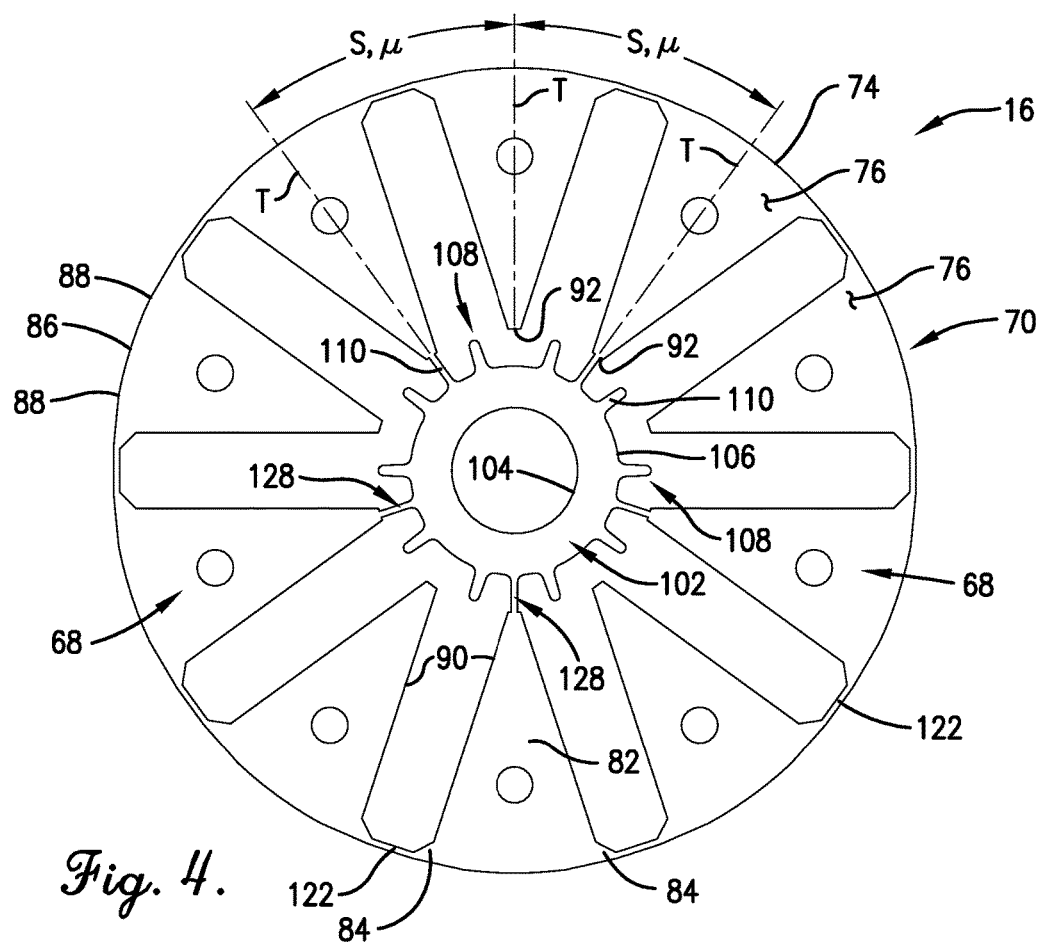
FIG. 4 is a top plan view of the rotor core of FIG. 2.
Figure 5:
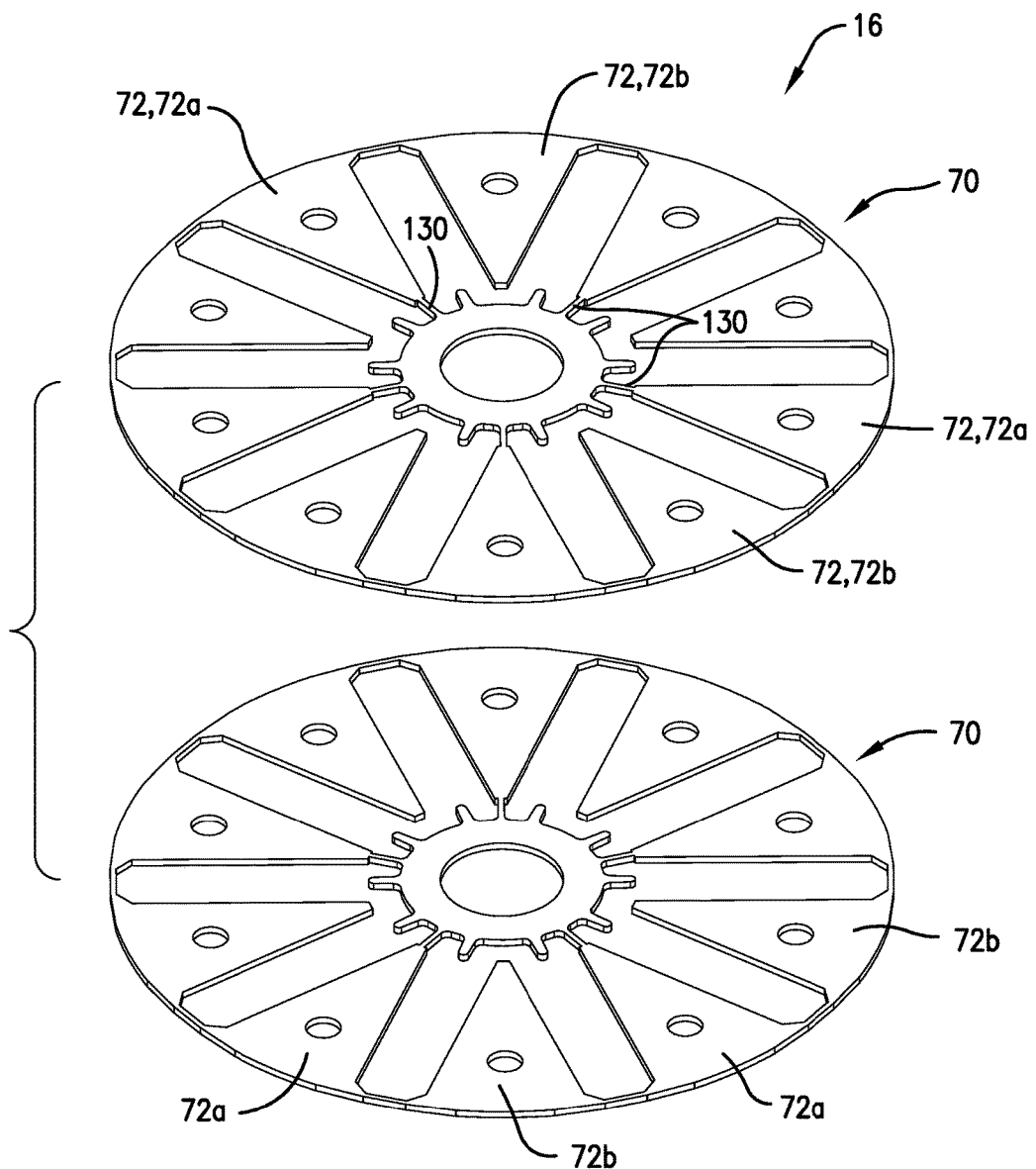
FIG. 5 is an exploded top perspective view of a pair of adjacent laminations of the rotor core of FIGS. 2 and 4.

With initial reference to FIGS. 1 and 2, an electric motor 10 is provided for use in a machine. In a preferred embodiment, the motor 10 is configured for use in a heating, ventilation, and air conditioning (HVAC) system; a pump; or a home appliance. However, alternative applications fall within the scope of the present invention.

In a preferred embodiment, the motor 10 has a horsepower range between about one-tenth (1/10) hp and about ten (10) hp. More preferably, the horsepower range is between about one-sixth (1/6) hp and about five (5) hp. Most preferably, the horsepower range is between about three (1/3) hp and about one (1) hp. However, higher or lower horsepower motors fall within the scope of some aspects of the present invention.

Preferably, the motor 10 is a variable speed motor, with an operating range from about zero (0) rpm to about four thousand (4,000) rpm. However, it is within the ambit of the present invention for the motor to be a single-speed motor, a multiple-speed motor, or to have a different speed range.

The motor 10 broadly includes a rotor 12 and a stator 14. The rotor 12 is rotatable about an axis. In a preferred embodiment, as shown, the stator 14 at least substantially circumscribes the rotor 12, such that the motor 10 is an inner rotor motor. It is permissible according to some aspects of the present invention, however, for the motor to be an outer rotor motor.

As will be discussed in greater detail below, the rotor 12 preferably includes a rotor core 16, a plurality of magnets 18, a shaft 20 defining a rotational axis A for the rotor 12, and a retention structure 22.

As will also be discussed in greater detail below, the stator 14 preferably includes a stator core 24, an electrically insulative covering 26 on the stator core 24, and a plurality of coils 28 wound about the stator core 24.

The motor 10 further preferably includes a housing 30. The housing 30 preferably includes a shell 32, a upper endshield 34, and a lower endshield 36. The shell 32 and the upper and lower endshields 34 and 36, respectively, preferably present a motor chamber 38 that at least substantially receives the stator 14 and the rotor 12.

In a preferred embodiment, the shell 32 extends generally circumferentially about the stator 14. It is permissible according to some aspects of the present invention, however, for the shell to extend in such a manner as to provide one or more flat sides, in contrast to the preferred generally cylindrical form, or to be otherwise alternatively shaped.

The upper endshield 34 preferably supports an upper bearing 40. The lower endshield 36 preferably support a lower bearing (not shown). The upper bearing 40 and the lower bearing preferably cooperatively rotatably support the shaft 20. Alternative or additional bearings supports or shaft supports may be provided without departing from the scope of the present invention, however.

The upper and lower endshields 34 and 36 are preferably secured to the shell 32 by means of fasteners 42 that also extend through the stator 14, although alternative securement means fall within the ambit of the present invention.

The housing 30 further preferably includes a controller can 44. In a preferred embodiment, the controller can 44 and the lower endshield 36 cooperatively define a controller chamber (not shown) that at least substantially houses a motor controller (not shown). Alternative controller locations and/or configurations are permissible, however.

Stator Overview

As noted previously, the stator 14 preferably includes a stator core 24, an electrically insulative covering 26 on the stator core 24, and a plurality of coils 28 wound about the stator core 24.

In a preferred embodiment, the stator 14 is generally toroidal in form. The stator core 24 is likewise preferably generally toroidal in form and defines an axis B of the stator 14. Preferably, the axis B of the stator 14 is coaxial with that of the rotor 12. However, it is permissible according to some aspects of the present invention for the axes to be non-coaxial.

The stator core 24 preferably includes an annular yoke 46 and a plurality of arcuately spaced apart teeth 48 extending at least generally radially from the yoke 46.

Preferably, the teeth 48 extend radially inwardly from the yoke 46 (because of the preferred inner rotor motor design), although it is permissible according to some aspects of the present invention for the teeth to extend generally outwardly (e.g., in the case of an outer rotor motor).

Each tooth 48 preferably includes a generally radially extending arm (not shown) and a generally arcuately extending crown 52 extending from one end (preferably the radially inner end) of the arm.

Each crown 52 preferably presents a circumferential crown face 54 spaced opposite the yoke 46. The circumferential crown faces 54 preferably cooperatively define an inner radial surface 56 of the stator core 24. In an alternative embodiment in which the motor is an outer rotor motor, however, the crown faces might instead present an outer radial margin of the stator core.

In a preferred embodiment, the yokes 46 cooperatively present an outer radial surface 58 of the stator core 24. The outer radial surface 58 preferably defines an outer diameter of the stator 14 as a whole.

The stator core 24 preferably has an inner diameter defined by the inner radial surface 56. In a preferred inner rotor motor 10, as illustrated, such inner diameter must necessarily be larger than the outer diameter of the rotor 12. More particularly, as will be discussed in greater detail below, the rotor 12 and the stator 14 preferably define a thin, circumferentially extending gap 60 therebetween.

Each pair of adjacent teeth 48 preferably defines a slot 62 therebetween. Preferably, the stator core 24 includes twelve (12) teeth 48, such that twelve (12) slots 62 are defined. However, it is permissible according to some aspects of the present invention for the number of teeth and, in turn, the number of slots, to vary.

The coils 28 preferably comprise electrically conductive wiring 64. The wiring 64 is preferably wound about each of the teeth 48 through the slots 62 to form the coils 28, with each of the coils 28 corresponding to one of the teeth 48. More particularly, the wiring 64 is preferably wound about each arm to form the coils 28.

The wiring 64 preferably comprises copper or aluminum, although any one or more of a variety of electrically conductive materials may be used without departing from the scope of the present invention.

The stator core 24 is preferably a laminated stator core comprising a plurality of axially stacked laminations (not individually shown). However, it is permissible for the stator core to be a solid stator core without departing from the scope of the present invention.

The stator core 24 preferably comprises steel. However, it is permissible without departing from the scope of some aspects of the present invention for any one or more of a variety of suitable materials to be used for the stator core.

As noted previously, an insulative covering 26 is preferably provided on the stator core 24. The covering 26 preferably comprises an at least substantially electrically insulative material. In a preferred embodiment, for instance, the insulative covering 26 comprises a synthetic resin material. However, any one or more of a variety of substantially electrically insulative materials may be used without departing from the scope of the present invention.

In a preferred embodiment, the insulative covering 26 comprises a plurality of electrically insulative endcaps 66. However, it is noted that use of any one or more of a variety of insulation means, including but not limited to the use of electrically insulative overmolding, powder-coating, inserts, and/or liners, is permissible according to some aspects of the present invention. It is also permissible according to some aspects of the present invention for the stator core to be devoid of electrical insulation.

The wiring 64 is preferably wound about the teeth 48 on the outside of the endcaps 66, such that the wiring 64 is not in direct contact with the stator core 24 itself where the endcaps 66 are present. That is, the covering 26 preferably electrically insulates the stator core 24 from the wiring 64 and additionally provides a physical barrier between the stator core 24 and the wiring 64.

Rotor Overview

As noted previously, the rotor 12 preferably includes a rotor core 16, a plurality of magnets 18, a shaft 20, and a retention structure 22.

The rotor core 16 preferably comprises a plurality of pole segments 68 arranged arcuately about the axis A (or, alternatively described, about the shaft 20). Similarly, the magnets 18 are preferably arranged arcuately about the axis A or shaft 20. In a preferred embodiment, as illustrated, the pole segments 68 alternate arcuately with the magnets 18, such that each of the magnets 18 is at least in part interposed between adjacent pole segments 68.

Preferably, the pole segments 68 are evenly arcuately arranged. Similarly, the magnets 18 are preferably evenly arcuately arranged. Yet further, each magnet 18 is preferably centrally positioned between adjacent pole segments 68. Each magnet 18 is also preferably in direct contact with adjacent ones of the pole segments 68. It is permissible according to some aspects of the present invention, however, for uneven arrangements or variably spaced arrangements to be used.

In a preferred embodiment, ten (10) pole segments and ten (10) magnets 18 are provided, such that the motor 10 is a twelve (12) slot, ten (10) pole motor. However, it is permissible according to some aspects of the present invention for other numbers of slots and poles achieving a preferred six (6) slot:five (5) pole ratio to be present. For instance, the motor might in an alternative embodiment include twenty-four (24) slots and twenty (20) poles. Yet further, the motor might instead have an entirely different slot:pole ratio (e.g., 9:10 or 3:2) and corresponding actual number of slots and poles (e.g., nine (9) slots and ten (10) poles, or twelve (12) slots and eight (8) poles) without departing from the scope of some aspects of the present invention.

Pole Segments

The pole segments 68 preferably each comprise a magnetically conductive metallic material such as steel. For instance, the pole segments 68 might suitably comprise S85H2 steel. It is permissible for any one or more of a variety of magnetically conductive materials to be used, however. For instance, a steel of an alternative grade might be provided.

In a preferred embodiment, as will be discussed in greater detail below, the pole segments 68 are interconnected in such a manner as to allow for only a small amount of transfer of magnetic flux. However, designs enabling significant flux transfer or even completely eliminating flux transfer are permissible according to some aspects of the present invention.

The rotor core 16 preferably comprises a plurality of axially stacked laminations 70 that cooperatively define the pole segments 68. More particularly, each lamination 70 preferably defines a plurality of pole segment portions 72, with the pole segment portions 72 cooperatively defining the pole segments 68.

The laminations 70 in the illustrated embodiment are about twenty-two thousandths (0.022) inches thick, although other thicknesses (e.g., five tenths (0.5) mm or about one hundred ninety-seven ten-thousandths (0.0197) inches) are permissible without departing from the spirit of some aspects of the present invention. Furthermore, it is permissible according to some aspects of the present invention for the rotor core 16 to in whole or in part be non-laminated (e.g., monolithically formed).

As will be discussed in greater detail below, the pole segments 68 preferably at least in part cooperatively present an annular core face 74 and a pair of axially spaced apart, generally radially extending upper and lower faces 76 and 78 that cooperatively at least substantially define an abstract (i.e., spatially defined) core envelope C providing axial and radial boundaries to the rotor core 16. More particularly, the core envelope C is preferably an imaginary shape that generally corresponds with the outermost dimensions of the core 16.

In a preferred embodiment, each pole segment 68 preferably includes a main body 82 and a pair of ears 84 each extending generally arcuately outwardly from the body 82 in opposition to each other.

More particularly, each main body 82 preferably presents a body face 86 presenting a pair of arcuately spaced apart body margins 88, a pair of arcuately spaced sides 90 extending generally radially from the body margins 88, and an inner face 92 extending between and interconnecting the sides 90 to present a radially innermost face of the respective main body 82.

Each of the ears 84 preferably presents a radially outermost ear face 94 extending directly from a corresponding one of the body margins 88. Each ear also presents a radially innermost rear face 96 disposed radially inwardly of the corresponding ear face 94 and extending directly from a corresponding one of the sides 90 of the main body 82. Yet further, the ears 84 each also preferably present a tip margin 98 spaced generally arcuately from the main body 82 and extending between and interconnecting the corresponding ear face 94 and rear face 96.

In a preferred embodiment, the body faces 86 each extend concentrically with the rotor axis A. That is, each of the body faces 86 extends along a circular path and presents a center of curvature D coincident with the axis A, such that the body faces 86 cooperatively define portions of a right circular cylinder. In keeping with the above, each of the body faces 86 presents a radius of curvature E that will be described in greater detail below in relation to the rotor 12 more broadly. It is permissible according to some aspects of the present invention, however, for the body faces 86 to present alternative geometries.

The aforementioned right circular cylinder defined by the body faces 86 defines the core envelope C. That is, the body faces 86 each are disposed along the envelope C.

As noted previously, the pole segment sides 90 preferably extend generally radially. More particularly, it is preferred that the pole segment sides 90 of a given pole segment 68 each extend inwardly (i.e., taper) toward each other so as to deviate somewhat from perfectly radial extension. That is, the pole segments 68 are preferably generally wedge shaped by merit of the tapered sides 90.

Even more particularly, the adjacent sides 90 of each pair of adjacent pole segments 68 preferably extend parallel to one another. As will be discussed in greater detail below, such shaping is advantageous in relation to the magnets 18.

In keeping with the above, it is also preferable that the inner face 92 is shorter in a generally circumferential/arcuate (or tangential) direction than the body face 86. For instance, in a preferred embodiment, the body face 86 has a body face length F that is between about five (5) times and about ten (10) times a length G of the inner face 92. Most preferably, the body face length F is about eight (8) times the inner face length G. In the illustrated embodiment, for instance, the inner face 92 has a length G of about fifty thousandths (0.050) inches. The body face 86 has a length F of about four hundred five thousandths (0.405) inches.

The ear faces 94 are preferably at least substantially flat, although curves and/or other geometric features are permissible according to some aspects of the present invention.

Most preferably, in addition to the aforementioned generally arcuate or circumferential extension, the ear faces 94 extend radially inwardly from the corresponding body margins 88. That is, each of the ear faces angles radially inwardly so as to be disposed radially inside the envelope C and define a taper angle H relative to a tangent plane I defined at the corresponding body margin 88.

Furthermore, each of the ear faces 94 can preferably be described as presenting a radially innermost ear edge 100 disposed radially inwardly of the envelope C by an ear recess distance J.

In a preferred embodiment, as illustrated, the taper angle H is between about four (4) degrees and about eight (8) degrees. Most preferably, the taper angle H is about five and twenty-five hundredths (5.25) degrees.

In a preferred embodiment, the core face 74 or, alternatively stated, the core envelope C defines a core or envelope radius K. As will be apparent to those of ordinary skill in the art, such core or envelope radius K is preferably equal to the previously described radius of curvature E of the body faces 86, such that the body faces 86 may be described as cooperatively defining the core or envelope radius K.

Preferably, the ear recess distance J is between about two tenths (0.2) percent and about five tenths (0.5) percent of the core or envelope radius K. Most preferably, the ear recess distance J is about thirty-six hundredths (0.36) percent of the core or envelope radius K. In the preferred illustrated embodiment, the ear recess distance is about fifty-seven ten thousandths (0.0057) inches. In comparison, the core or envelope radius K and, in turn, the radius of curvature E of the body faces 86) is about one and six tenths (1.6) inches.

The body faces 86 preferably each extend arcuately along a body arc angle L. The ear faces 94 each preferably each extend along an ear arc angle M. In a preferred embodiment, the body arc angle L is between about equal to and about three (3) times each ear arc angle M. Most preferably, the body arc angle L is about two (2) times each ear arc angle M. In the illustrated embodiment, for instance, the body arc angle L is about fifteen (15) degrees, while the ear arc angle M is about seven and five tenths (7.5) degrees.

As noted previously, the body faces 86 present a body face length F of about four hundred five thousandths (0.405) inches. The ears faces 94 each preferably present an ear length N of about two hundred nine thousandths (0.209) inches.

With further regard to pole segment 68 geometry, in a preferred embodiment, the rear faces 96 of the ears 84 and each corresponding one of the main body sides 90 form an obtuse rear angle O therebetween. The rear angle O is preferably between about one hundred twenty (120) and one hundred fifty (150) degrees. Most preferably, the rear angle O is about one hundred thirty-five (135) degrees.

The above-described general design and specific geometry achieves several unexpected advantages. For instance, provision of a spoked rotor 12 (i.e., one using arcuately alternating pole segments 68 and magnets 18, rather than, for instance, surface magnets) enables high concentration of flux from the magnets 18 and a relatively low volume of costly active material (e.g., in contrast to non-spoked rotor designs). Furthermore, provision of tapered ears 84 and concentric main body faces 86 configured as described above (e.g., in terms of relative angular extent, radius of curvature, taper angle, and recession depth) surprisingly reduces cogging torque and noise while minimizing reduction of active material at the core face 74 (to thereby maximize flux). Alternatively stated, in a preferred embodiment of the present invention, cogging torque, torque ripple, and noise are reduced to a suitable degree without excessive increases to the size of the air gap 60. In contrast, improper proportioning and/or shaping would result in detrimental effects with regard to cogging torque, noise, and/or flux concentration relative to those achieved by the present invention.

The above-described design also eliminates the need for skewed magnetization of the rotor magnets, the provision of specially shaped or skewed stator teeth, lobed (non-concentric) rotor pole segment faces, and other performance-degrading design features. (It is noted that skewed rotor core designs, although not necessary, fall within the ambit of some aspects of the present invention and will be discussed in greater detail below.)

Support Structure

In a preferred embodiment, the rotor 12 further includes a support structure 102 that at least in part supports the rotor core 16 for rotation with the shaft 20. Preferably, as illustrated, the support structure 102 is integrally formed with the rotor core 16 and, more particularly, is cooperatively formed by the laminations 70. It is permissible according to some aspects of the present invention, however, for non-integral formations to be provided. For instance, the pole segments of the core might be secured to the support structure by means of dovetails or other interlocking geometry.

In a preferred embodiment, the support structure 102 is generally toroidal and circumscribes the shaft 20. More particularly, the support structure 102 presents circumferential inner and outer faces 104 and 106. The inner face 104 preferably is fixed to the shaft 20 (e.g., by means of an interference fit, mechanical interconnection, etc.) such that the support structure 102 rotates with the shaft 20.

Furthermore, although the support structure 102 is preferably non-integral with the shaft 20, integral formation of the shaft and support structure or of all of the shaft, support structure, and core fall within the scope of some aspects of the present invention.

It is preferable that the support structure 102 be disposed radially inwardly of the pole segments 68, in keeping with the preferred inner rotor configuration, although outward positioning and accompanying changes to the general rotor configuration (e.g., in an outer rotor motor) are permissible according to some aspects of the present invention.

Preferably, as will be discussed in greater detail below, the support structure 102 includes magnet retaining structure 108. More particularly, magnet retaining structure 108 comprises a plurality of radially extending, arcuately spaced apart retention nubs 110 configured to restrict radially inward shifting of corresponding ones of the magnets 18. Alternative or additional means of restricting such shifting are permissible according to some aspects of the present invention, however. For instance, in a preferred embodiment and as discussed in greater detail below, the retention structure 22 aids in fixation of the magnets 18. Furthermore, the magnets might be instead or additionally be secured or restricted by means of radially inner and/or outer, generally arcuately extending tabs or other geometric features defined by the pole segments and/or the support structure.

Magnets

Each magnet 18 is preferably generally cuboidal in form. More particularly, each magnet 18 preferably presents a radially innermost face 112, a radially outermost face 114, a pair of circumferentially spaced apart side faces 116, and axially spaced apart upper and lower faces 118. The faces 112,114,116,118 are preferably at least substantially flat and arranged in a cuboidal manner. It is permissible according to some aspects of the present invention, however, for the magnet shapes to vary (e.g., via the provision of one or more curved faces and/or non-orthogonal interfaces between the faces), although the sides of the adjacent pole segments to be complementally shaped.

The radially innermost face 112 of each magnet 18 is preferably spaced from but adjacent a corresponding one of the magnet-retention nubs 110 of the support structure 102. Similarly, the radially outermost faces 114 are preferably spaced from but adjacent the corresponding ones the rear faces 96 of corresponding ones the pole segment ears 84. Furthermore, each of the side faces 116 preferably directly abuts a corresponding one of the pole segment sides 90. As noted previously, the sides 90 are preferably generally radially extending. Most preferably, the sides 90 deviate somewhat from perfect radial extension to taper inwardly toward each other. Even more particularly, adjacent sides 90 of adjacent pole segments 68 extend at least substantially parallel to one another. Thus, circumferential and radial shifting of each magnet 18 is at least substantially restricted by the adjacent pole segments 68 and the support structure 102.

In a preferred embodiment, each magnet 18 is preferably oriented such that its polarity is oriented generally tangentially. Furthermore, the directions of polarity of the magnets 18 are preferably alternated. More particularly, the north pole of a first one of the magnets 18 preferably faces the north pole of a second one of the magnets 18, etc. That is, each pole segment 68 preferably abuts only like poles of the adjacent magnets 18, with the poles segments 68 therefore themselves alternating in polarity.

It is permissible according some aspects of the present invention, however, for alternatively oriented and/or arranged magnets to be provided.

In a preferred embodiment, the magnets 18 are permanent magnets. Furthermore, the magnets 18 preferably comprise ferrite. However, other magnet materials (e.g., neodymium and other rare earth materials) may be used without departing from the scope of the present invention.

Retention Structure

As noted previously, the rotor 12 preferably includes a retention structure 22. The retention structure 22 preferably aids in securement of the magnets 18 to the core 16. (Such structure 22 is preferably provided in addition to the aforementioned geometric/structural means of relative positioning of components—e.g., the magnet retention nubs 110 ofthe support structure 102, the rear faces 96 of the pole segments ears 84, etc.)

In a preferred embodiment, the retention structure 22 is formed of a magnetically insulative material, such that no magnetic flux or only negligible magnetic flux (e.g., the flux corresponding to a flux density of fifteen (15) mT or less) flows therethrough. More particularly, the retention structure 22 preferably supports and positions the pole segments 68 and the magnets 18 without facilitating flux flow between adjacent pole segments 68.

In a preferred embodiment, the retention structure 22 comprises a synthetic resin material. It is permissible according to some aspects of the present invention, for part or all of the retention structure to instead comprise an alternative at least substantially magnetically insulative material. For instance, the retention structure might include an aluminum bracket securing the pole segments and magnets, as well as an overmolded shell supporting the bracket.

Yet further, a portion of the retention structure that does not engage the pole segments and/or the magnets might alternatively be formed of a magnetically conductive material. Such portion would not interfere with the desired substantial magnetic isolation of the pole segments.

All in all, any one or more of a variety of materials capable of enabling the features and qualities described herein (e.g., magnetic shielding capability, structural rigidity, etc.) may be used to form the retention structure without departing from some aspects of the present invention.

Preferably, however, as will be discussed in greater detail below, the retention structure 22 comprises a body 120 overmolded over at least portions of the pole segments 68 and the magnets 18 so as to secure the pole segments 68 relative to each other, the magnets 18 relative to each other, and the pole segments 68 and magnets 18 relative to each other.

Such body 120 preferably is formed of a magnetically insulative material (e.g., a plastic) that is an least somewhat flowable (or at least malleable) composition capable of being molded into a rigid, self-sustaining body providing the necessary retention capabilities described above. The compositions for overmolding according to the invention will generally include a synthetic resin, such as an organic polymeric or oligomeric resin that is capable of hardening or crosslinking during the overmolding process. In many instances, the composition will also include a crosslinking agent and/or a catalyst to initiate crosslinking, since a thermosetting plastic is typically preferred.

The body 120 is preferably formed by use of a mold (not shown). Broadly speaking, in a preferred method of assembly, the pole segments 68 and magnets 18 are positioned in the mold to be alternately arcuately arranged. The retention structure material is preferably injected into the mold by any means known in the art to create the overmolded body 120 and secure the pole segments 68 and the magnets 18. However, a variety of suitable molding techniques will be apparent to those of ordinary skill in the art.

Furthermore, it is permissible according to some aspects of the present invention for some or all of such features to be formed by a non-overmolded retention structure or a non-overmolded portion or portions of a partially overmolded retention structure. For instance, a plastic mounting plate might be provided, with the magnets and pole segments being fastened or otherwise secured to the plate after the plate is formed.

Preferably, the retention structure 22 is configured in such a manner that the rotor 12 may be magnetized after assembly. However, pre-assembly magnetization is permissible.

Outer Pole-Interconnecting Bridges

In a preferred embodiment, as illustrated, the rotor core 16 includes a plurality of outer bridges 122 extending between and interconnecting adjacent ones of the pole segments 68. More particularly, the outer bridges 122 preferably extend between and interconnect adjacent ears 84 of adjacent ones of the pole segments 68. Most preferably, the outer bridges 122 extend from the tip margins 98 of the ears 84.

The outer bridges 122 each preferably present radially inner and outer bridge faces 124 and 126, respectively. The bridge faces 124 and 126 of a given bridge 122 are preferably parallel to one another, with the outer bridges 122 thereby being at least substantially straight and extending tangentially relative to the core envelope C.

Each ear face 94 defines an ear-bridge angle P with an adjacent one of the outer bridge faces 126. Preferably, such angle P is between about one hundred seventy-two (172) degrees and about one hundred seventy-six (176) degrees. That is, each ear face 94 preferable angles inwardly between about four (4) degrees and about eight (8) degrees from the adjacent outer bridge face 126.

Most preferably, the ear-bridge angle P is about one hundred seventy four and five tenths (174.5) degrees. That is, the ear face 94 preferable angles inwardly about five and five tenths (5.5) degrees from the corresponding outer bridge face 126.

The preferred geometry of the outer bridges 122 relative to the pole segments 68 may also be described in terms of the extent to which the radially outer bridge faces 126 are disposed radially inwardly of the core envelope C (defined, as noted previously, by the body faces 86 of the main bodies 82 of the pole segments 68). More particularly, the outer faces 126 are each disposed radially inwardly of the core envelope C by a bridge recess distance Q. The bridge recess distance Q is preferably between about thirty-five hundredths (0.35) percent and about sixty-five hundredths (0.65) percent of the core or envelope radius K (or, alternatively stated, of the radius of curvature E of the corresponding body face 86). Most preferably, the bridge recess distance Q is about five tenths (0.5) percent of the core or envelope radius K.

As noted previously, in a preferred embodiment, the core or envelope radius K and, in turn, the radius of curvature E, are about one and six tenths (1.6) inches. The bridge recess distance Q is about eight thousandths (0.008) inches.

Preferably, the outer bridges 122 present a generally radial thickness R. The thickness R is preferably between about one (1) percent and about two (2) percent of the core or envelope radius K (or body face radius of curvature E). Most preferably, the bridge thickness R is about one and five tenths (1.5) percent of the core or envelope radius K. More specifically, in a most preferred embodiment, each bridge thickness R is about twenty-four thousandths (0.024) inches.

The outer bridges 122 are preferably relatively thin to reduce flux flow between adjacent pole segments 68 while nevertheless providing advantageous structural rigidity to the rotor 12 (e.g., by means of bracing the pole segments 68 relative to each other). That is, the outer bridges 122 preferably provide beneficial increased rotor rigidity and air gap control while maintaining low flux flow between adjacent pole segments 68. It is permissible according to some aspects of the present invention, however, for the bridges to be configured to achieve alternative design goals (e.g., thicker bridges might be provided in a rotor for which structural rigidity is significantly greater relative importance than efficient flux concentration).

It is also noted that provision of the bridges 122 preferably increases manufacturability of the rotor 12 (particularly of the rotor core 16). Yet further, the bridges 122 dampen permeance, resulting in less torque ripple under load. Even further still, provision of the outer bridges 122 simplifies formation of the preferred overmolded retention structure 22.

With further regard to the retention structure 22, it is noted that the bridges 122 as described above provide structural integrity to the rotor core 16 in a most preferred embodiment. However, it is permissible for the retention structure 22 to also facilitate securement of the pole segments 68 relative to one another, particularly in alternative embodiments in which fewer or no outer bridges are provided.

Interior Bridges

In a preferred embodiment, the rotor 12 also includes a plurality of interior bridges 128. Each of the interior bridges 128 preferably extends between and interconnects a corresponding one of the pole segments 68 to the support structure 102. Similarly to the outer bridges 122, the interior bridges 128 thus provide a degree of structural rigidity to the rotor core 16 as a whole.

Preferably, the interior bridges 128 each comprise a plurality of axially spaced apart bridge segments 130. More particularly, as noted previously, each of the laminations 70 preferably includes a plurality of arcuately arranged pole segment portions 72. Furthermore, each lamination 70 also preferably includes a plurality of the bridge segments 130, each of which extends from a corresponding one of the pole segment portions 72. Each interior bridge 128 is cooperatively formed by a subset of the laminations 70 and, more particularly, by the bridge segments 130 of a subset of the laminations 70.

For instance, in the illustrated embodiment, axially alternating ones of the rotor laminations 70 form each of the bridge segments 130, with axially alternating ones of the rotor laminations 70 thereby cooperatively forming each interior bridge 128.

Preferably, the laminations 70 are identical (within manufacturing tolerances) or at least substantially identical to one another. However, axially adjacent ones of the laminations 70 are arcuately (i.e., angularly) offset from one another by a rotation angle S. More particularly, with reference to FIGS. 6a and 7, the rotation angle S is preferably such that the bridge segments 130a of a first one of the laminations 70a do not overlie the bridge segments 130b of an immediately adjacent second lamination 70b. Furthermore, the bridge segments 130c of a third lamination 70c, wherein the second lamination 70b is disposed directly between the first and third laminations 70a and 70c, respectively, do align with the bridge segments 130a of the first lamination 70a but are offset from (i.e., not aligned with) the bridge segments 130b of the second lamination 70b). In such a manner, a bridge 128 having axial spaces 132 therein is formed.

Preferably, each of the laminations 70 includes fewer of the bridge segments 130 than pole segment portions 72. Most preferably, for instance, each lamination 70 includes half as many bridge segments 130 as pole segment portions 72, with the bridge segments 130 being evenly arcuately distributed. That is, the bridge segments 130 preferably extend from arcuately alternating ones of the pole segment portions 72, such that the pole segments portions 72 preferably include arcuately alternating bridged pole segment portions 72a and non-bridged pole segment portions 72b. For instance, as illustrated, it is most preferred that each lamination 70 include ten (10) pole segment portions 72 and five (5) bridge segments 130, such that five (5) bridged pole segments 72a are provident in arcuately alternating fashion with five (5) non-bridged pole segments 72b.

Figure 6:
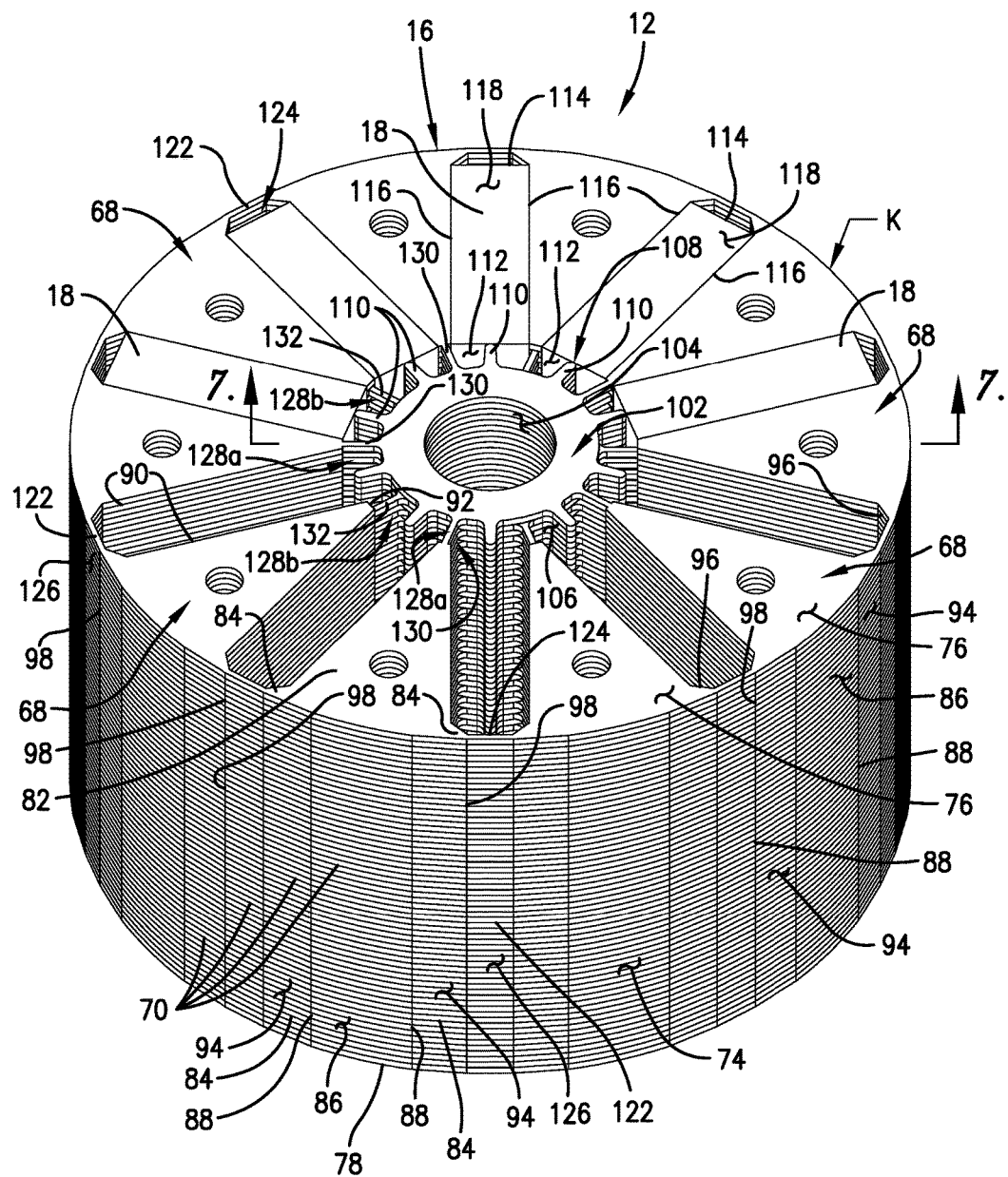
FIG. 6 is a top perspective view of the rotor core and magnets of FIG. 2, with several magnets removed to illustrate the rotor core design.
Figure 6A:
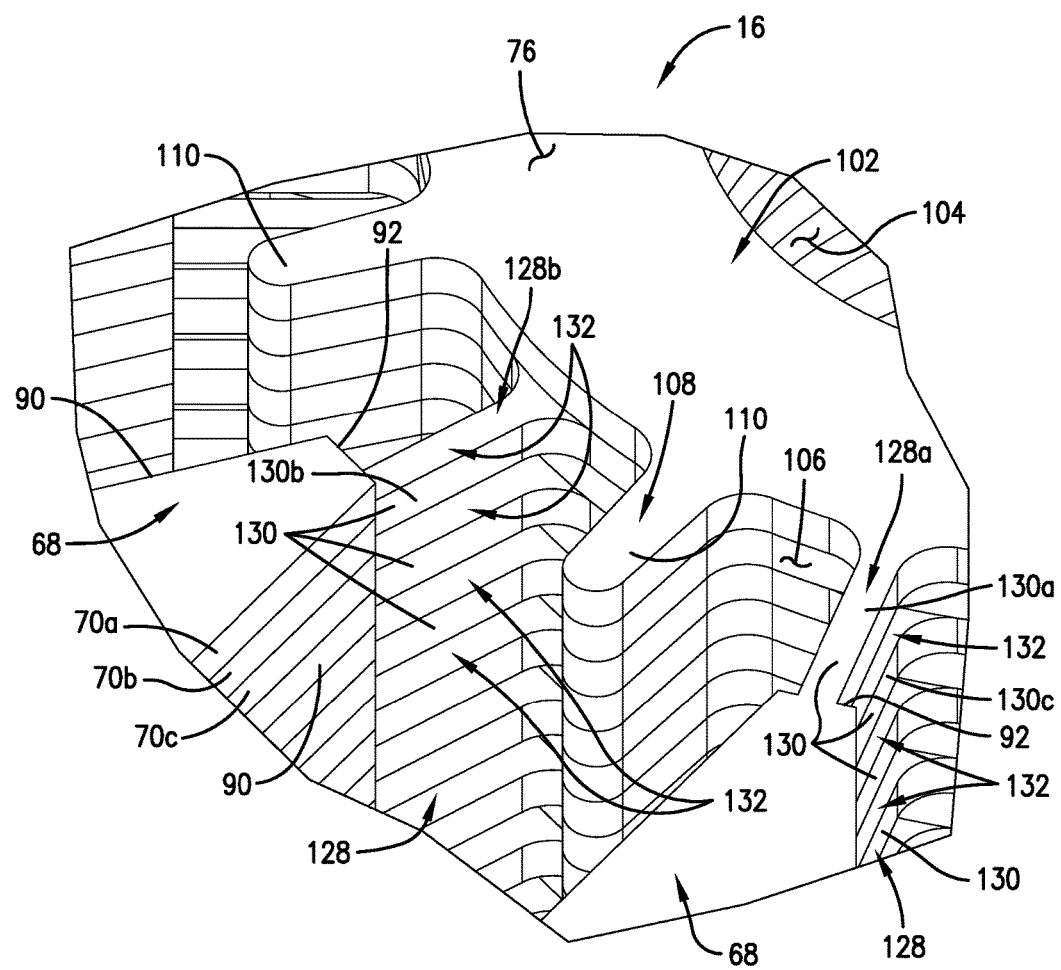
FIG. 6a is an enlarged, fragmentary top perspective view of a portion of the rotor core of FIG. 6, particularly illustrating details of the interior bridges.
Figure 8:
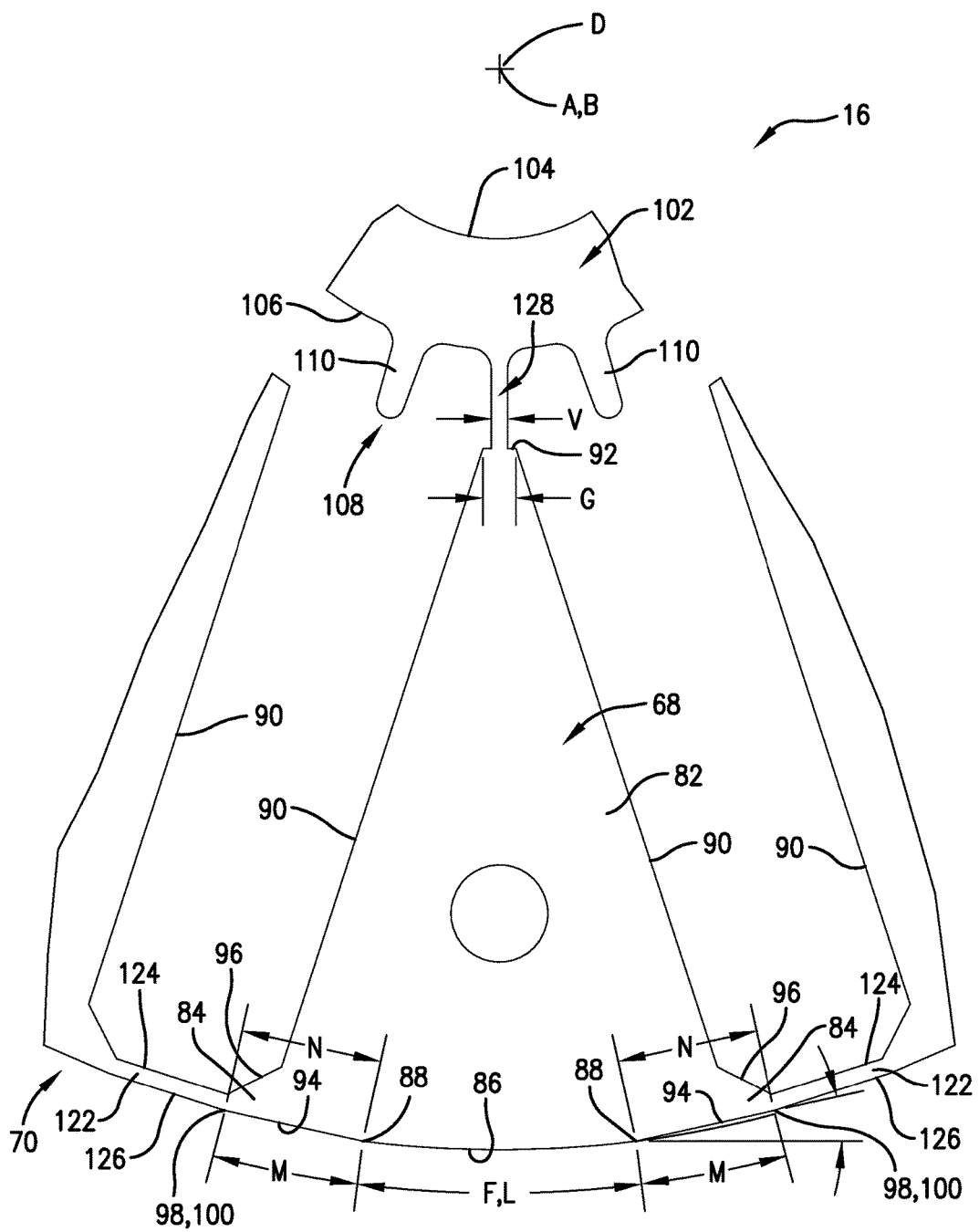
FIG. 8 is an enlarged, fragmentary top plan view of a portion of the rotor core of FIG. 6 and others, particularly illustrating geometric features thereof.
Figure 9B:
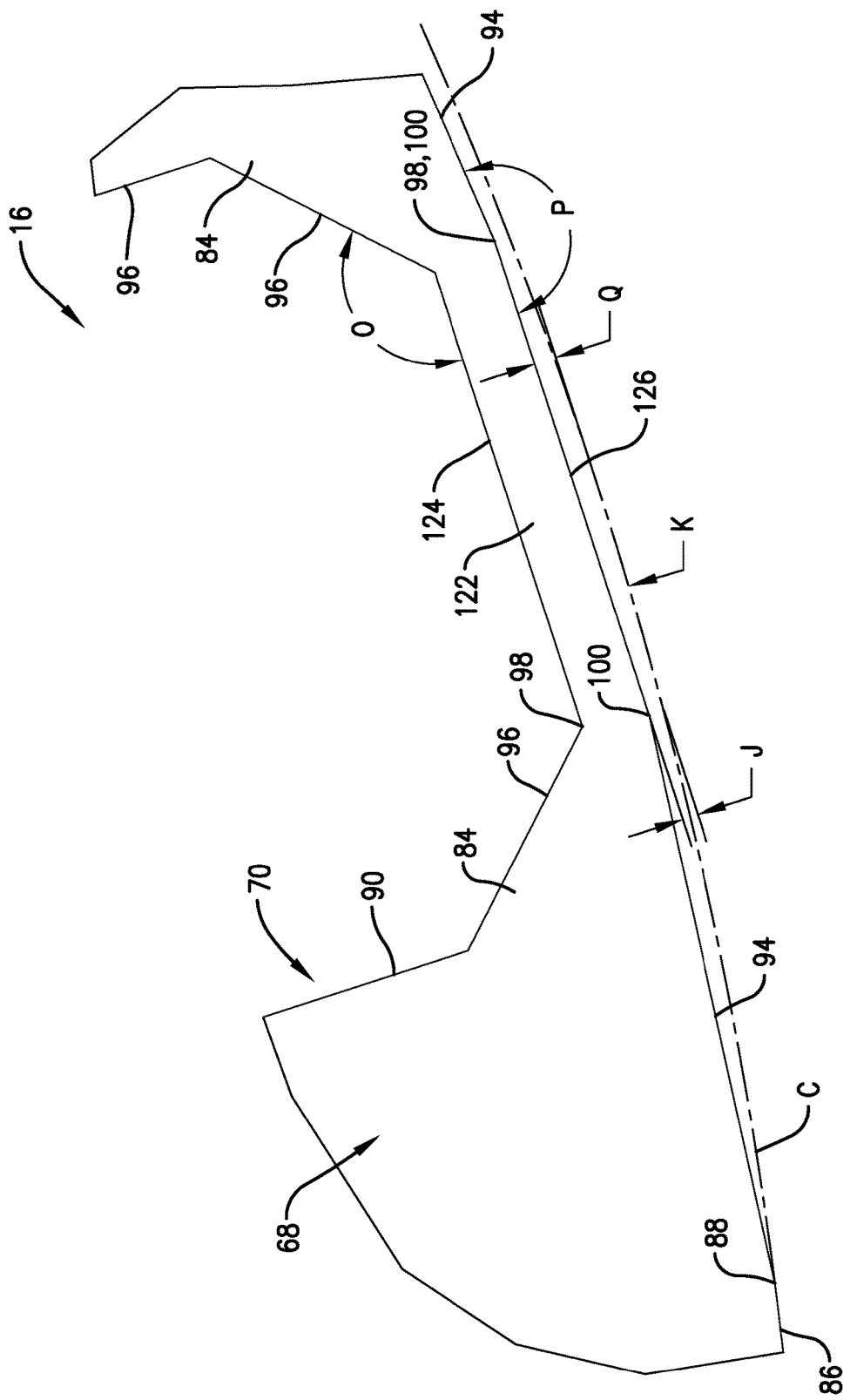
FIG. 9b is a still further enlarged, fragmentary top view of the portion of the rotor core of FIGS. 8 and 9a, further illustrating geometric features thereof.

It is also noted that, in alternative embodiments, the laminations might be substantially non-identical in such a manner as to achieve similarly axially discontinuous bridges. For instance, laminations including only bridged pole segments might be stacked alternately with laminations including only non-bridged pole segments. However, other deficiencies aside, such an alternative embodiment would fail to achieve the axially offset bridge configuration of the preferred embodiment, whereby, at a given axial position, bridge segments 130 and spaces 132 alternate arcuately. That is, arcuately adjacent ones of the bridges 128 are preferably axially offset from one another by the thickness of a lamination 70. With reference to FIGS. 6 and 6a, for instance, bridges 128a include uppermost bridge segments 130, while bridges 128b, alternating arcuately with bridges 128a, include uppermost spaces 132.

In a preferred embodiment, each of the pole segments 68 presents a generally radially extending geometric centerline T. The geometric centerlines T are arcuately offset from one another about the axis A by a pole segment spacing angle U. Preferably, in keeping with the above-described preferred interior bridge 128 configuration, the rotation angle S and the spacing angle U are at least substantially equal.

As noted previously, the rotor core 16 preferably includes ten (10) of said pole segments 68. The pole segments 68 are preferably equally spaced apart, such that the geometric centerlines T thereof are each spaced apart by about thirty-six (36) degrees. Thus, in a preferred embodiment of the present invention, the rotation angle S and the spacing angle U are each about thirty-six (36) degrees.

As will be apparent to one of ordinary skill in the art, a different number of pole segments would preferably result in correspondingly different rotation angle due to the change in the spacing angle. For instance, an eight-pole rotor would preferably include laminations rotated about forty-five (45) degrees relative to one another.

It is particularly noted that, although it is preferred that each of the subsets comprises bridge segments 130 of axially alternating ones of the laminations 70, alternative spacing is permissible. For instance, each bridge could instead comprise bridge segments from every third lamination; each bridge could comprise sets of multiple axially adjacent bridge segments, each spaced apart by one or more laminations; the bridges could be axially irregular.

Preferably, the bridge segments 130 in a given bridge 128 are at least substantially axially aligned such that, in turn, the bridges 128 in a broad sense are at least substantially straight. However, single- or bi-directional skewing of the bridge segments and the associated bridge (e.g., to form a helical bridge or a zig-zag bridge), as well as of the associated pole segment portions and pole segment as a whole, is permissible according to some aspects of the present invention. That is, in some alternative embodiments, the rotation angle might vary from the pole segment spacing angle for one or more of the laminations.

In a preferred embodiment, as noted previously, each pole segment main body 82 preferably presents a body face 86, a pair of arcuately spaced sides 90 extending generally radially from the body margins 88, and an inner face 92 extending between and interconnecting the sides 90. A generally arcuate minimum pole segment width G, equal to the previously described inner face length G, is preferably defined at the inner face 92. Each of the interior bridges 128 preferably presents a minimum generally arcuate interior bridge width V. The bridge width V is preferably between about twenty five (25) percent and about seventy-five (75) percent of the minimum pole segment width G. Most preferably, the bridge width V is about half of the pole segment width G. Other proportions fall within the scope of some aspects of the present invention, however.

In a preferred embodiment, as illustrated, the bridge width V is about twenty-five thousandths (0.025) inches. As noted previously, the inner face length or minimum pole segment width G is preferably about fifty thousandths (0.050) inches.

The above-described axially discontinuous interior bridges 128 provide advantageous structural rigidity to the rotor 12 while decreasing the flux leakage associated with conventional (i.e., axially continuous, etc.) bridges or with designs in which the rotor core includes a hub into which pole segments connect directly (e.g., via dovetail connections, integral formation, etc.). This reduced flux leakage results in more torque-producing flux across the previously described gap 60, improving motor performance in a broad sense. Such reduced leakage also preferably enables magnetization of the rotor core 16 after assembly, leading to increased assembly efficiency and associated cost savings.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. A rotor for use in an electric motor and rotatable about an axis, said rotor comprising:
   a core including a plurality of pole segments arranged arcuately about the axis;
   a plurality of arcuately arranged magnets alternating with the pole segments, such that each of the magnets is at least in part interposed between a pair of adjacent pole segments; and
   a support structure at least in part supporting the pole segments,
   said core further including a plurality of bridges,
   each of said bridges extending between and interconnecting a corresponding one of said pole segments to said support structure,
   each of said bridges comprising a plurality of axially spaced apart bridge segments,
   said core comprising a plurality of stacked laminations,
   said laminations cooperatively defining the pole segments and the bridges, said laminations being at least substantially identical to one another, axially adjacent ones of said laminations being arcuately offset from one another about the axis by a rotation angle.

2. The rotor of claim 1, said rotation angle being such that axially alternating ones of said laminations cooperatively define each of said bridges.

3. The rotor of claim 2, each of said pole segments presenting a geometric centerline, said geometric centerlines being arcuately offset from one another about the axis by a pole segment spacing angle, said rotation angle and said spacing angle being at least substantially equal.

4. The rotor of claim 3, said core including ten of said pole segments, said rotation angle and said spacing angle each being about 36°.

5. The rotor of claim 1, each of said laminations comprising a plurality of arcuately arranged pole segment portions and a plurality of said bridge segments, each of said bridge segments portions extending from a corresponding one of said pole segment portions.

6. The rotor of claim 1, said laminations cooperatively defining said support structure.

7. The rotor of claim 1, said rotor further comprising a shaft rotatable about the axis, said support structure being fixed to said shaft to rotate therewith.

8. The rotor of claim 1, said support structure being disposed radially inside said pole segments.

9. The rotor of claim 1, said core including said support structure.

10. The rotor of claim 1, each of said pole segments presenting a minimum generally arcuate pole segment width, each of said bridges presenting a minimum generally arcuate bridge width, said bridge width being between about 25 % percent and about 75 % said pole segment width.

11. The rotor of claim 10, said bridge width being about half of said pole segment width.

12. The rotor of claim 1, said core further including a plurality of outer bridges extending between and connecting adjacent ones of the pole segments.

13. A rotor for use in an electric motor and rotatable about an axis, said rotor comprising:

a core including a plurality of pole segments arranged arcuately about the axis;

a plurality of arcuately arranged magnets alternating with the pole segments, such that each of the magnets is at least in part interposed between a pair of adjacent pole segments; and a support structure at least in part supporting the pole segments, said core further including a plurality of bridges, each of said bridges extending between and interconnecting a corresponding one of said pole segments to said support structure, each of said bridges comprising a plurality of axially spaced apart bridge segments, said core comprising a plurality of stacked laminations, said laminations cooperatively defining the pole segments and the bridges, each of said laminations comprising a plurality of arcuately arranged pole segment portions and a plurality of said bridge segments, each of said bridge segments portions extending from a corresponding one of said pole segment portions, each of said laminations comprising fewer of said bridge segments than said pole segment portions.

14. The rotor of claim 13, said bridge segments extending from arcuately alternating ones of said pole segment portions.

15. The rotor of claim 14, each of said bridges comprising an at least substantially aligned set of said bridge segments.

16. The rotor of claim 15, each of said sets comprising bridge segments of axially alternating ones of the laminations.

17. The rotor of claim 13, each of said pole segments presenting a minimum generally arcuate pole segment width, each of said bridges presenting a minimum generally arcuate bridge width, said bridge width being between about 25 % percent and about 75 % said pole segment width.

18. The rotor of claim 13, said laminations being at least substantially identical to one another.

19. A rotor for use in an electric motor and rotatable about an axis, said rotor comprising:

a core including a plurality of pole segments arranged arcuately about the axis;

a plurality of arcuately arranged magnets alternating with the pole segments, such that each of the magnets is at least in part interposed between a pair of adjacent pole segments; and a support structure at least in part supporting the pole segments, said core further including a plurality of bridges, each of said bridges extending between and interconnecting a corresponding one of said pole segments to said support structure, each of said bridges comprising a plurality of axially spaced apart bridge segments, said core further including a plurality of outer bridges extending between and connecting adjacent ones of the pole segments, said pole segments at least in part cooperatively presenting an annular core face, said core face at least in part defining a core envelope, said core envelope defining a core radius, each of said pole segments including — a main body presenting a body face extending concentrically with the axis and disposed along the envelope, said body face presenting a pair of arcuately spaced apart body edges, and a pair of ears each extending generally arcuately outwardly from a corresponding one of the body edges, each of said ears presenting a substantially flat ear face extending directly from the corresponding one of the body edges, each of said ear faces defining a taper angle relative to a tangent plane defined at the corresponding one of the body edges, each of said ear faces being disposed radially inside the envelope and presenting a radially innermost ear edge disposed radially inwardly of said envelope by an ear recess distance, said taper angle being between about 4 degrees and about 8 degrees, said ear recess distance being between about 0.2 % and 0.5 % of said core radius.

20. The rotor of claim 19, said core comprising a plurality of stacked laminations, said laminations cooperatively defining the pole segments and the bridges.

* * * * *